Patented Nov. 7, 1939

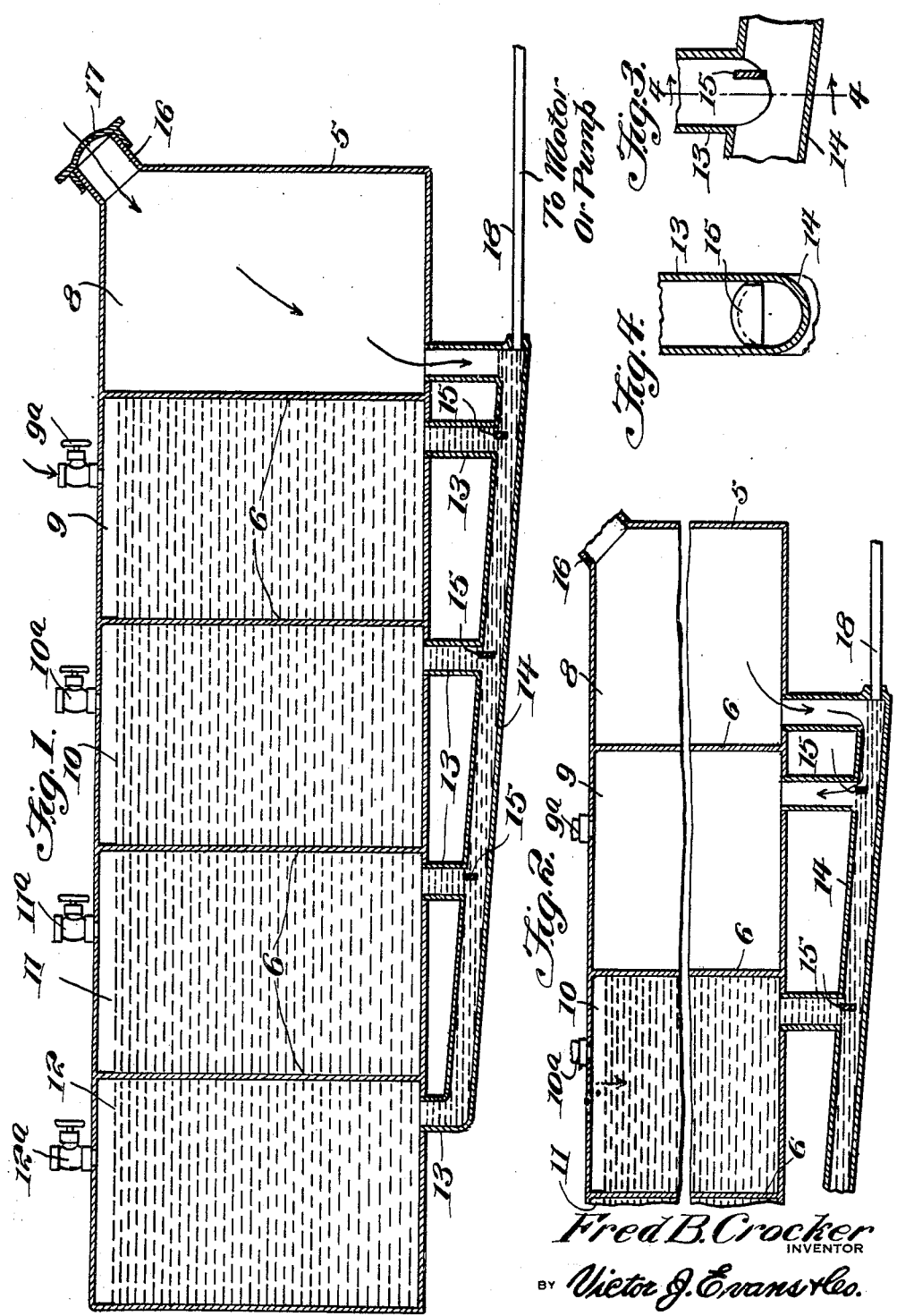

2,178,564

UNITED STATES PATENT OFFICE 2,178,564

FUEL SUPPLY TANK

Fred B. Crocker, Fostoria, Ohio

Application October 11, 1938, Serial No. 234,471

2 Claims. (Cl. 137—21)

My invention relates to tanks and particularly to fuel tanks employed in connection with motor vehicles and the like for supplying fuel to the engine.

One of the principal objects of my invention is to provide a fuel supply tank equipped with means for reducing the agitation of the fuel therein whereby to minimize evaporation thereof and thus effect an economy in fuel.

Another object of my invention is to provide a fuel supply tank of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a vertical sectional view of a fuel tank constructed in accordance with my invention.

Figure 2 is a similar view to Figure 1 illustrating one phase in the operation of my invention.

Figure 3 is an enlarged detail sectional view of the connection between the tank and fuel feed pipe thereof.

Figure 4 is a detail sectional view taken on the line 4—4 of Figure 3.

My invention, which I term an economy fuel supply tank, comprises an elongated tank 5 fashioned with a plurality of spaced partitions 6 dividing said tank into a plurality of air-tight compartments, one of which adjacent one end of the tank constitutes a filler compartment 8 and the others constituting successive supply or storage compartments 9, 10, 11 and 12 respectively located in progressive order away from the compartment 8.

The upper wall of each of the compartments 9, 10, 11 and 12 is provided with vent valves 9a, 10a, 11a and 12a respectively whereby said compartments may be vented or closed as desired. The bottom wall of each of the compartments 8, 9, 10, 11 and 12 is fashioned with a connection 13 effecting communication between the respective compartment and a fuel feed pipe 14 connected to the lower end of said connection, the pipe 14 being inclined downwardly from the compartment 12 towards the compartment 8.

The feed pipe is fashioned with baffle plates 15 disposed adjacent the outlet ports of the respective connections 13 whereby to preclude air escaping from one compartment being emptied to another during advance draining of one compartment relative to another. The compartment 8, on the upper end thereof, is fashioned with an intake or filler connection 16 normally closed by a vented cap 17 whereby to admit air into said compartment at all times. The outer end of the pipe 14, adjacent the compartment 8, is connected to a feed line 18 for supplying fuel from said pipe to a motor or the like.

In operation, the valves being open and the tank empty, fuel, for instance gasoline or the like, is introduced through the filler connection 16 into the filler compartment 8 and passes downwardly therethrough into the pipe 14, thence into the other compartments through the connections 13. When the various compartments have been filled, including the filler compartment 8, the valves are actuated to closed condition thereby sealing the fuel in the compartments 9, 10, 11 and 12. When the fuel is thus sealed in the foregoing mentioned compartments, fuel will feed from the filler compartment 8 through the connection 13 thereof into the pipe 14 and to the line 18, due to said compartment 8 being in communication with the atmosphere through the vent in the cap 17.

When the fuel has been drained from the compartment 8 and the level thereof in the pipe 14 drops below the port of the connection 13 of the adjacent compartment, air will be introduced into said adjacent compartment through the connection of the latter and compartment 8 including the section of pipe 14 therebetween and effect a flow of the fuel from said latter compartment into the pipe 14. As each compartment is drained in successive order, air will be introduced into the adjacent compartment in the foregoing manner enabling all of the compartments to be drained in successive order.

While I have shown and described the valves 9a, 10a, 11a and 12a as being mounted on the fuel tank, it is to be understood that said valves may be located remotely of said tank and connected thereto by suitable pipes.

From the foregoing it will be apparent that I have provided a fuel tank so constructed and arranged with the air-tight compartments whereby to minimize the agitation of the fuel in said compartments with resultant reduction in evaporation due to the fact that said compartments are in sealed condition when not in operation for supply fuel therefrom. A device of the above described character effects an appreciable savings in fuel, such as gasoline, when utilized in connection with motor vehicles and the like.

What I claim is:

1. A device of the character described, comprising, a tank provided with a plurality of spaced partitions dividing said tank into fuel storage compartments having sealed top and bottom walls and a permanently vented filler compartment, a vent valve in said top wall of each storage compartment, a fuel outlet connection in the bottom wall of each of said compartments, and a fuel supply pipe connected to said outlet connections and coacting with the latter to drain said storage compartments of fuel in successive order when said valves are closed and said filler compartment has been advancedly drained.

2. A device of the character described, comprising, a tank provided with a plurality of spaced partitions dividing said tank into fuel storage compartments having sealed top and bottom walls and a permanently vented filler compartment, a vent valve in said top wall of each storage compartment, a fuel outlet connection in the bottom wall of each of said compartments, a fuel supply pipe connected to said outlet connections and coacting with the latter to drain said storage compartments of fuel in successive order when said valves are closed and said filler compartment has been advancedly drained, and baffle plates mounted in said fuel supply pipe adjacent said connections to preclude air escaping from one compartment being emptied to another during advance draining of one compartment relative to another.

FRED B. CROCKER.